July 12, 1949. W. A. EATON 2,475,701
FLUID PRESSURE SYSTEM
Filed Dec. 6, 1945
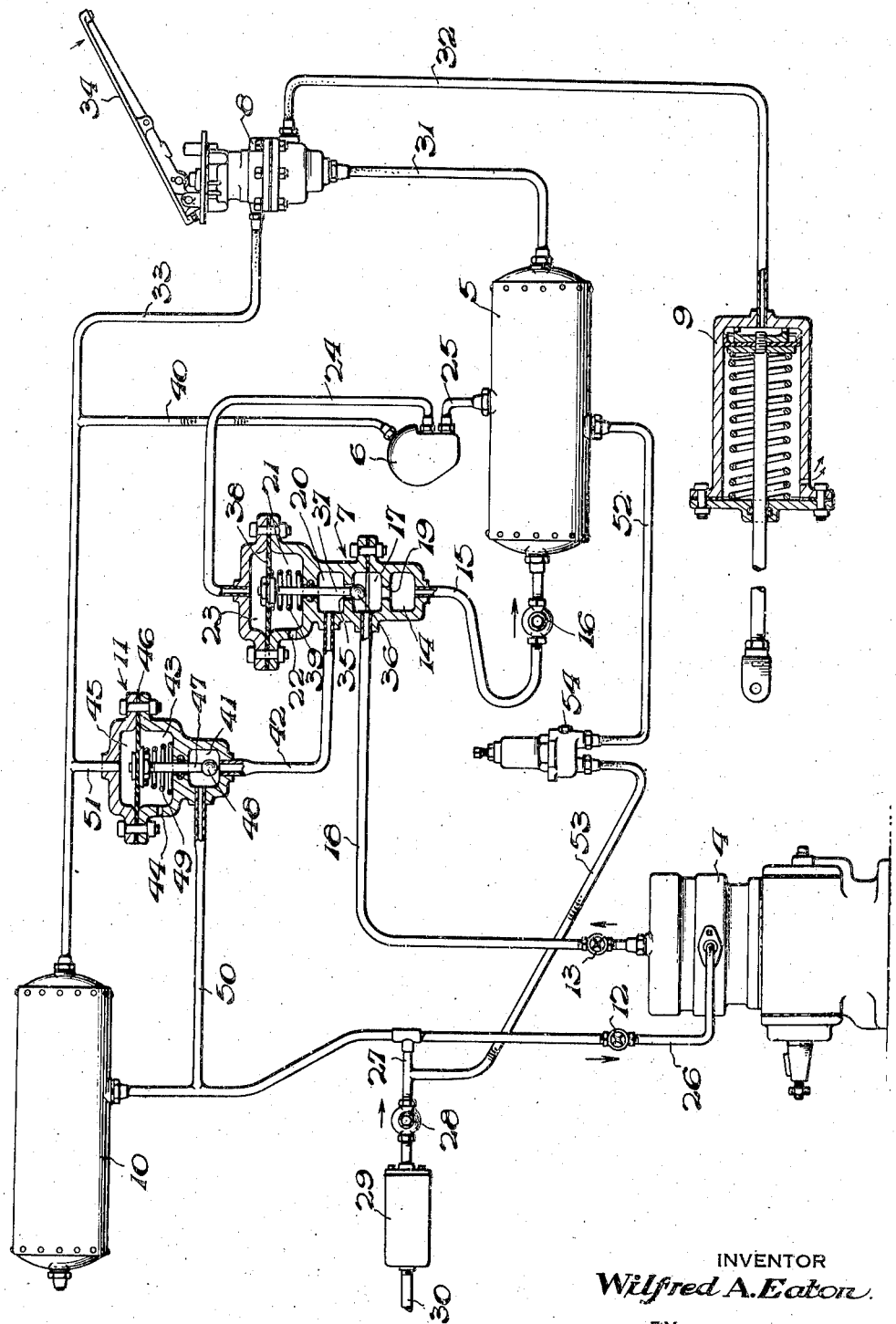
INVENTOR
*Wilfred A. Eaton.*
BY
*Scrivener & Parker*
ATTORNEYS Patented July 12, 1949

UNITED STATES PATENT OFFICE 2,475,701

FLUID PRESSURE SYSTEM

Wilfred A. Eaton, Oakville, Conn., assignor to Bendix-Westinghouse Automotive Air Brake Company, Elyria, Ohio, a corporation of Delaware Application December 6, 1945, Serial No. 633,247

15 Claims. (Cl. 60—62)

This invention relates to fluid pressure pumping and supply systems, and more particularly to a system of the so-called closed type.

Systems of the above type may comprise in general a compressor, a main reservoir adapted to receive fluid pressure from the compressor, a governor for unloading the compressor when the pressure in the reservoir exceeds a predetermined value, a control valve for supplying fluid pressure from the reservoir to an actuator, and a return line leading from the exhaust port of the control valve to the inlet port of the compressor, a reservoir generally being interposed in the return line for the purpose of storing the fluid exhausted from the control valve until such time as this fluid can again be returned to the main reservoir by the action of the compressor. It is characteristic in systems of this type that certain amount of back-pressure is developed in the return line which tends to retard the release of fluid pressure from the actuator by the control valve, and it is accordingly an object of the present invention to provide simple and efficient means for controlling the operation of the compressor and for controlling the back pressure in the return line.

Another object of the invention is to provide, in a system of the above type, a back pressure control valve, so constituted as to insure operation of the compressor to pump fluid from the return line to a main reservoir when the pressure in the return line exceeds a predetermined value.

These and other objects of the invention will be more readily understood when considered in connection with the following description and the accompanying drawing. It is to be expressly understood, however, that the drawing is employed for the purposes of illustration only, and is not designed as a definition of the limits of the invention, reference being had for this purpose to the appended claims.

In the drawing, the system is shown as comprising in general a compressor 4, a reservoir 5, a governor 6 controlled by the pressure in the reservoir 5, an unloader valve mechanism 7 controlled by the operation of the governor, an operator's control valve 8 adapted to control the flow of fluid pressure from the reservoir to an actuator 9, as well as the release of fluid pressure therefrom, a return reservoir 10, and a back pressure control valve 11.

In this particular case, the system is illustrated as adapted for use with an air compressor if desired, and the compressor 4 is provided with a one-way check valve 12 which may act as an inlet valve, and a one-way check valve 13 which acts as a discharge valve. The unloader valve 7 is provided with an outlet chamber 14 connected with the reservoir 5 by means of a conduit 15 and a one-way check valve 16 interposed therein, an inlet chamber 17 connected with the discharge valve of the compressor by means of a conduit 18 and with the outlet chamber by means of a port 19, an exhaust chamber 20, an atmospheric chamber 21 provided with an atmospheric port 22, and a control chamber 23 connected with the governor 6 by means of a conduit 24, the governor in turn being connected with the reservoir 5 by means of a supply conduit 25. The inlet valve 12 is connected with the inlet of the compressor by means of a conduit 26, the other side of the check valve being connected to atmosphere through a conduit 27 connected with conduit 26 and having a one-way check valve 28 interposed therein, an air drier 29 connected to the left end of the conduit 27, and an inlet pipe 30 connecting the drier with atmosphere. Thus on initial operation of the compressor, air is taken into the compressor through the conduit 30, the drier 29, the one-way check valve 28 and the conduit 27, the conduit 26 and the inlet valve 12, and is discharged to the reservoir 5 through the discharge valve 13, the conduit 18, the chamber 17, the port 19, the outlet chamber 14, the conduit 15 and the one-way check valve 16. The operator's control valve 8 may be of the self-lapping type similar to that disclosed in the patent to William J. Andres and Roy S. Sanford, 2,133,275 dated October 18, 1938, the valve being connected with the reservoir 5 by means of a conduit 31, with the actuator 9 by means of a conduit 32, and with the return line reservoir 10 by means of a return line 33. The control valve is provided with a pedal 34, and it will be understood in view of the above patent, that with the pedal in the position shown, the valve is operated to establish communication between conduits 32 and 33 and to prevent communication between conduits 31 and 32 while on downward movement of the control pedal, the valve is operable to connect conduits 31 and 32 to establish a pressure in the conduit 32 substantially proportional to the degree of movement of the control pedal, and at the same time to prevent communication between conduits 32 and 33. Thus fluid pressure is supplied to the actuator 9 at any desired pressure, and on release of the pedal 34, this pressure is exhausted into the return reservoir 10 through the conduit 32, valve mechanism 8 and the conduit 33. In order to complete the circuit to the inlet of the compressor, the upper end of the conduit 26 is connected with the reservoir 10, and the compressor accordingly receives fluid from the reservoir 10 at a relatively low pressure, and supplies it to the reservoir 5 at a relatively high pressure through the connections above described. As heretofore stated, during initial operation of the compressor, air is taken in from the atmosphere to charge the compressor 5, and thereafter, due to the action of the governor 6 and the other control valve mechanism, to be described in more detail hereinafter, the only air taken in from atmosphere is that necessary to make up for any leakage in the conduits and other parts of the system.

The casing of the unloader valve 7 is provided with a port 35 serving to connect chambers 17 and 20, and the lower end of the port is normally closed by means of a valve 36 mounted on a stem 37 connected with a diaphragm 38 clamped in the housing and serving to separate chambers 21 and 23. A spring 39 below the diaphragm serves to normally maintain the valve 36 in closed position, and in the event fluid pressure is supplied to the chamber 23 through the conduit 24, the valve, which is of the so-called single-beat type, is moved to open position to open the port 35, without, however, closing the port 19 under any condition of operation. The governor 6 is of well known conventional type, and serves when the pressure in the reservoir reaches a predetermined value, to establish direct communication between conduits 25 and 24, whereupon fluid pressure is supplied to the diaphragm 38, and the valve 36 is moved to open position. As the pressure in the reservoir 5 decreases a predetermined amount below said predetermined value, the governor operates to disestablish communication between conduits 25 and 24, and to establish communication between the conduit 24 and the return conduit 33 through a conduit 40, connected at one end with the return line 33, and connected at the other end with an exhaust port, not shown, in the governor 6.

The control valve mechanism 11 is provided with an inlet chamber 41 connected with the chamber 20 of the valve 7 by means of a conduit 42, an atmospheric chamber 43 provided with an atmospheric port 44, and a control chamber 45, the control chamber being separated from the atmospheric chamber by means of a diaphragm 46 clamped in the housing as shown. A downwardly extending stem 47 is attached to the center of the diaphragm as shown, and is provided at its lower end with a valve 48 adapted on downward movement to close the upper end of the conduit 42, the valve being normally maintained in open position by means of a spring 49 interposed between the casing and the lower side of the diaphragm. The chamber 41 is connected with the conduit 26 by means of a conduit 50, and it will thus be apparent that in the event the pressure in the reservoir 5 increases to a value sufficient to operate the governor 6 to connect the conduits 24 and 25, the unloader valve 36 will be moved to open position, and the discharge line 18 will be connected with the inlet conduit 26 through chamber 17, port 35, chamber 20, conduit 42, chamber 41, conduit 50, conduit 26 and the inlet check valve 12, whereupon the fluid pumped by the compressor will be continually recirculated through the connections above described. When the pressure drops sufficiently to again operate the governor to disconnect conduits 24 and 25 and to connect conduits 24 and 40, fluid pressure will be exhausted from the diaphragm chamber 23 of the unloader valve, and the valve 36 will be returned to closed position by means of the spring 39. When this occurs, the compressor will again supply fluid pressure to the reservoir 5 through the passages heretofore described. During the period in which the compressor is unloaded by the opening of the unloader valve 36, the check valve 16 will serve to prevent the return flow of fluid pressure from the high pressure reservoir 5 to the inlet port of the compressor.

Assuming that the reservoir 5 is fully charged, and that the governor has operated to supply fluid pressure to the unloader valve mechanism 7 to open the unloader valve 36, it will be apparent that on operation of the control valve 8 to supply fluid pressure to the actuator 6, the pressure in the reservoir 5 may be sufficiently depleted to operate the governor to again load the compressor, whereupon the compressor will again take in atmospheric air through the conduit 30 and the attached connections in order to make up the volume of air which was delivered to the actuator by the control valve. When the pressure in the reservoir 5 again reaches its maximum value, the governor and the unloader valve mechanism will again operate to unload the compressor in order to prevent the further delivery of fluid pressure to the reservoir by the compressor. If the pedal of the control valve 8 is now moved to released position, a relatively large quantity of compressed fluid will be almost instantaneously discharged into the return line 33 and the return reservoir 10 resulting in a considerable increase in the pressure in the return reservoir. This discharge of pressure into the return reservoir will not result in any decrease in pressure in the reservoir 5, and consequently we have a condition wherein the pressure in the return line and in the return reservoir is appreciably increased in a period during which the compressor is unloaded and is therefore not discharging compressed fluid into the reservoir 5. Thus the compressor will be ineffective to reduce this excessive back-pressure in the return reservoir, and this condition is taken care of automatically by the operation of the control valve mechanism 11. As heretofore stated, the valve 48 is normally maintained in open position by the spring 49, and the tension of this spring is so chosen with respect to the area of the diaphragm 46 that a small increase in the back-pressure in the return line 33, which is connected to the chamber 45 by means of a conduit 51, will be sufficient to close the valve in order to prevent recirculation of the fluid from the discharge line 18 to the inlet line 26 by the compressor. Due to the relative areas of the diaphragm 46 and the valve 48 a relatively small pressure in the chamber 45 above the diaphragm will maintain the valve 48 in closed position against the pressure pumped by the compressor, and on closing of the valve 48, the compressor will immediately begin to exhaust fluid from the reservoir 10 and pump it into the reservoir 5 through the passages already described, thus automatically operating to definitely limit the degree of back-pressure which can be built up in the reservoir 10, this limitation being a function of the design of valve mechanism 11 and the capacity of the compressor 4. As soon as the back-pressure in the reservoir 10 drops to a value which will not seriously interfere with the release of fluid pressure from the actuator 9, the valve 48 will again be opened by the action of the spring 49, and the compressor will again be unloaded and will recirculate fluid until such time as the pressure in reservoir 5 drops sufficiently to operate the governor to release fluid pressure from the chamber 23 of the unloader valve mechanism 7 in order to permit closing of the unloader valve 36 by the action of the spring 39.

Thus, simple and efficient means have been provided for limiting the degree of back-pressure in the return reservoir 10 regardless of the action of the governor 6 and the unloader valve mechanism 7. In the event the pressure in the reservoir 5 exceeds a chosen predetermined value, preferably higher than that at which the governor operates to actuate the unloader valve mechanism to unload the compressor, the excess pressure may be discharged to the inlet line of the compressor through a conduit 52 connected with reservoir 5, a conduit 53 connected with the conduit 27, and a pressure regulator valve or safety valve 54 interposed between conduits 52 and 53. This valve is also of conventional design, and is so constructed as to establish communication between conduits 52 and 53 when the pressure in the conduits exceeds a predetermined value, and to disestablish communication between the conduits when the pressure in the conduit 52 drops below that value. As the foregoing description indicates, any fluid discharged from high pressure reservoir is returned through one path or another to the inlet line of the compressor, and the only fluid lost to atmosphere is that lost due to leakage of the conduits and other portions of the system. Consequently, after the system has been fully charged, the amount of fluid taken in through the conduit 30 and the drier 29 is extremely small and is of such low magnitude as to permit the use of the drier of the silica-gel type or other conventional type to remove substantially all of the moisture from the fluid without requiring the use of a drier of excessive size. This acts to substantially eliminate all moisture from the system, and consequently eliminates the possibility of the formation of ice in the system at low temperatures which might otherwise interfere with satisfactory operation thereof. It is contemplated that the low pressure portion of the system may be designed to operate at a relatively low maximum pressure of the order of three or four pounds above atmospheric pressure, and the one-way check valve 28 effectively prevents the loss of this pressure to atmosphere through the drier 29 and the conduit 30.

While the invention has been illustrated and described herein with considerable particularity, it is to be understood that the same is not limited to the form shown, but may receive a variety of mechanical expressions as may readily appear to those skilled in the art. Reference will, therefore, be had to the appended claims for a definition of the limits of the invention.

What is claimed is:

1. A closed fluid pressure system comprising a compressor having an inlet and an outlet, a reservoir, means including a connection between said outlet and the reservoir for supplying fluid pressure to the latter, means responsive to a predetermined high pressure in the reservoir for establishing a connection between said outlet and inlet, an actuator, means including a control valve for connecting said reservoir with the actuator or for connecting the latter with said inlet, and pressure-responsive means associated with said last named means and responsive to a predetermined increase in pressure therein for interrupting the connection between said outlet and inlet for insuring withdrawal of fluid from said actuator by said compressor.

2. A closed fluid pressure system comprising a compressor having an inlet and an outlet, a reservoir, means including a connection between said outlet and the reservoir for supplying fluid pressure to the latter, means responsive to a predetermined high pressure in the reservoir for establishing a connection between said outlet and inlet, an actuator, a control valve for connecting the reservoir and actuator, a connection including a return reservoir between said valve and inlet for receiving fluid pressure from said actuator, and means responsive to a predetermined increase in pressure in the last named connection for interrupting the connection between said outlet and inlet for insuring withdrawal of fluid from said actuator by said compressor.

3. A closed fluid pressure system comprising a compressor having an inlet and an outlet, a main reservoir, means including a connection between said outlet and the reservoir for supplying fluid pressure to the latter, means for circulating fluid from the outlet to the inlet when the pressure in the reservoir reaches a predetermined maximum, a return line including a return reservoir connected with said inlet, an actuator, means to connect said main reservoir with the actuator or to connect the latter with the return line, and means responsive to a predetermined increase in pressure in the return line for interrupting said circulation of fluid from said inlet to said outlet to insure withdrawal of fluid from the return reservoir.

4. A closed fluid pressure system comprising a compressor having an inlet and an outlet, a main reservoir, means including a connection between said outlet and the reservoir for supplying fluid pressure to the latter, means responsive to a predetermined high pressure in the reservoir for unloading the compressor, a return line including a return reservoir connected with said inlet, an actuator, means to connect said main reservoir with the actuator or to connect the latter with the return line, and means responsive to a predetermined increase in pressure in the return line for loading said compressor to insure withdrawal of fluid from the return reservoir.

5. In a closed fluid pressure system having a compressor provided with an inlet and an outlet, a main reservoir, means including a one-way connection for conducting fluid pressure from the outlet to the reservoir, a return line including a return reservoir connected with the inlet, an actuator, means to connect said actuator with the main reservoir or with the return line, means including a valve device in said conducting means for connecting the outlet with the inlet when the pressure in said main reservoir reaches a predetermined high value, and a second valve device for interrupting communication between said outlet and inlet when the pressure in the return line attains a predetermined maximum.

6. A closed fluid pressure system comprising a compressor having an inlet and an outlet, a main reservoir, means including a connection between said outlet and the reservoir for supplying fluid pressure to the latter, a second connection between the first connection and the inlet, a normally closed valve controlling the second connection, means responsive to a predetermined high pressure in the reservoir for opening said valve, a normally open valve in said second connection, a return line including a return reservoir connected with said inlet, an actuator, means to connect said actuator with the main reservoir or with the return line, and means responsive to a predetermined increase in pressure in the return line for closing said normally open valve.

7. In a closed fluid pressure system having a compressor provided with an inlet and an outlet, a main reservoir, means including a one-way connection for conducting fluid pressure from the outlet to the reservoir, a return line including a return reservoir connected with the inlet, an actuator, means to connect said actuator with the main reservoir or with the return line, means responsive to a predetermined high pressure in said main reservoir for establishing a connection between said outlet and said inlet, a second means responsive to a higher predetermined pressure in the main reservoir for establishing a different connection between the main reservoir and the inlet, and means responsive to a predetermined increase in pressure in said return line for interrupting the first connection between the outlet and the inlet.

8. In a closed fluid pressure system having a compressor provided with an inlet and an outlet, a main reservoir, a conduit including a check valve connecting the outlet and reservoir and permitting flow of fluid from the outlet to the reservoir only, a return line including a return reservoir connected with said inlet, an actuator, means to connect said actuator with the main reservoir or with the return line, means including a second conduit connecting the first conduit and the return line, a normally closed valve in said second conduit, means responsive to a predetermined high pressure in the main reservoir for opening said valve, and valve means operable when the pressure in the return line reaches a predetermined maximum for closing said second conduit.

9. In a closed fluid pressure system having a compressor provided with an inlet and an outlet, a main reservoir, a conduit including a check valve connecting the outlet and reservoir and permitting flow of fluid from the outlet to the reservoir only, a return line including a return reservoir connected with said inlet, an actuator, means to connect said actuator with the main reservoir or with the return line, means including a second conduit connecting the first conduit and the return line, a normally closed valve in said second conduit, means responsive to a predetermined high pressure in the main reservoir for opening said valve, a normally open valve in said second conduit, and means responsive to a predetermined increase in pressure in the return line for closing said normally open valve.

10. In a closed fluid pressure system having a compressor provided with an inlet and an outlet, a main reservoir, a conduit including a check valve connecting the outlet and reservoir and permitting flow of fluid from the outlet to the reservoir only, a return line including a return reservoir connected with said inlet, an actuator, means to connect said actuator with the main reservoir or with the return line, means for unloading said compressor including a connection between the inlet and outlet, and means responsive to a predetermined increase in pressure in the return line to interrupt said connection.

11. In a closed fluid pressure system having a compressor provided with an inlet and an outlet, a main reservoir, a conduit including a check valve connecting the outlet and reservoir and permitting flow of fluid from the outlet to the reservoir only, a return line including a return reservoir connected with said inlet, an actuator, means to connect said actuator with the main reservoir or with the return line, means to unload the compressor when the pressure in the main reservoir reaches a predetermined high value, and means to load the compressor regardless of the operation of the unloading means.

12. In a closed fluid pressure system having a compressor provided with an inlet and an outlet, a main reservoir, a conduit including a check valve connecting the outlet and reservoir and permitting flow of fluid from the outlet to the reservoir only, a return line including a return reservoir connected with said inlet, an actuator, means to connect said actuator with the main reservoir or with the return line, means to unload the compressor when the pressure in the main reservoir reaches a predetermined high value, and means responsive to a predetermined increase in pressure in the return line to load the compressor regardless of the operation of the unloading means.

13. In a closed fluid pressure system having a compressor provided with an inlet and an outlet, a main reservoir, a conduit including a check valve connecting the outlet and reservoir and permitting flow of fluid from the outlet to the reservoir only, a return line including a return reservoir connected with said inlet, an actuator, means to connect said actuator with the main reservoir or with the return line, means to unload the compressor when the pressure in the main reservoir reaches a predetermined high value, and means responsive to a predetermined increase in pressure in the return line to render said unloading means inoperative.

14. In a closed fluid pressure system having a compressor provided with an inlet and an outlet, a main reservoir adapted to receive fluid from said outlet, means actuated by a predetermined high reservoir pressure to unload the compressor, a return line including a return reservoir connected with said inlet, an actuator, means to connect said actuator with the main reservoir or with the return line, and means actuated by a predetermined increase in pressure in said return line to render said unloading means inoperative.

15. In a closed fluid pressure system having a compressor provided with an inlet and an outlet, a main reservoir adapted to receive fluid from said outlet, a return line including a return reservoir connected with said inlet, an actuator, means to connect said actuator with the main reservoir or with the return line, unloading means for said compressor including a by-pass from the outlet to the inlet, and means responsive to a predetermined increase in pressure in the return line to insure withdrawal of fluid from the return reservoir regardless of operation of the unloading means.

WILFRED A. EATON.

REFERENCES CITED

The following references are of record in the file of this patent:

UNITED STATES PATENTS

| Number | Name | Date |
| --- | --- | --- |
| 509,898 | Hayden | Dec. 5, 1893 |
| 767,027 | Wilkinson | Aug. 9, 1904 |
| 877,531 | Turner | Jan. 28, 1908 |
| 1,503,922 | Slater | Aug. 5, 1924 |

FOREIGN PATENTS

| Number | Country | Date |
| --- | --- | --- |
| 306,571 | Great Britain | Feb. 25, 1929 |